United States Patent
Rautenbach et al.

(10) Patent No.: US 6,601,543 B2
(45) Date of Patent: Aug. 5, 2003

(54) METHOD OF UTILIZING A METHANE-CONTAINING BIOGAS

(75) Inventors: Robert Rautenbach, deceased, late of Sprockhövel (DE), by Christine Rautenbach, legal representative; Suleyman Yuce, Aachen (DE); Joachim Gebel, Aachen (DE); Alexander Schmitt, Krefeld (DE)

(73) Assignee: G.A.S. Energietechnologie GmbH, Krefeld (DE)

( * ) Notice: Subject to any disclaimer, the term of this patent is extended or adjusted under 35 U.S.C. 154(b) by 0 days.

(21) Appl. No.: 09/957,963

(22) Filed: Sep. 21, 2001

(65) Prior Publication Data

US 2002/0069838 A1 Jun. 13, 2002

(30) Foreign Application Priority Data

Sep. 23, 2000 (DE) .......................................... 100 47 264

(51) Int. Cl.⁷ ................................................. F02B 43/12
(52) U.S. Cl. ................ 123/3; 48/127.3; 95/50
(58) Field of Search ................ 60/39.12, 781; 95/42, 50, 51; 166/402; 123/198 F, 344, 3; 48/127.3

(56) References Cited

U.S. PATENT DOCUMENTS

| | | | | |
|---|---|---|---|---|
| 4,370,150 A | * | 1/1983 | Fenstermaker | 95/50 |
| 4,518,399 A | * | 5/1985 | Croskell et al. | 95/51 |
| 4,597,777 A | * | 7/1986 | Graham | 95/51 |
| 4,681,612 A | * | 7/1987 | O'Brien et al. | 95/50 |
| 5,085,274 A | * | 2/1992 | Puri et al. | 166/402 |
| 5,553,575 A | * | 9/1996 | Beck et al. | 123/198 F |
| 5,615,655 A | * | 4/1997 | Shimizu | 123/344 |
| 5,681,360 A | * | 10/1997 | Siwajek et al. | 95/42 |
| 5,727,903 A | * | 3/1998 | Borray et al. | 95/50 |
| 6,161,386 A | * | 12/2000 | Lokhandwala | 95/50 |
| 6,393,821 B1 | * | 5/2002 | Prabhu | 60/39.12 |

* cited by examiner

*Primary Examiner*—Michael Koczo
(74) *Attorney, Agent, or Firm*—Collard & Roe, P.C.

(57) ABSTRACT

In a method of utilizing a methane-containing biogas by feeding the methane-containing biogas to a gas engine of a gas engine/generator assembly generating electricity, the steps of passing the biogas through a membrane separating installation to divide the biogas into a first gas stream having a higher methane content than the biogas fed thereto and a second gas stream enriched in $CO_2$, feeding the first gas stream to the gas engine as fuel, and returning the second gas stream to the source of the biogas.

5 Claims, 2 Drawing Sheets

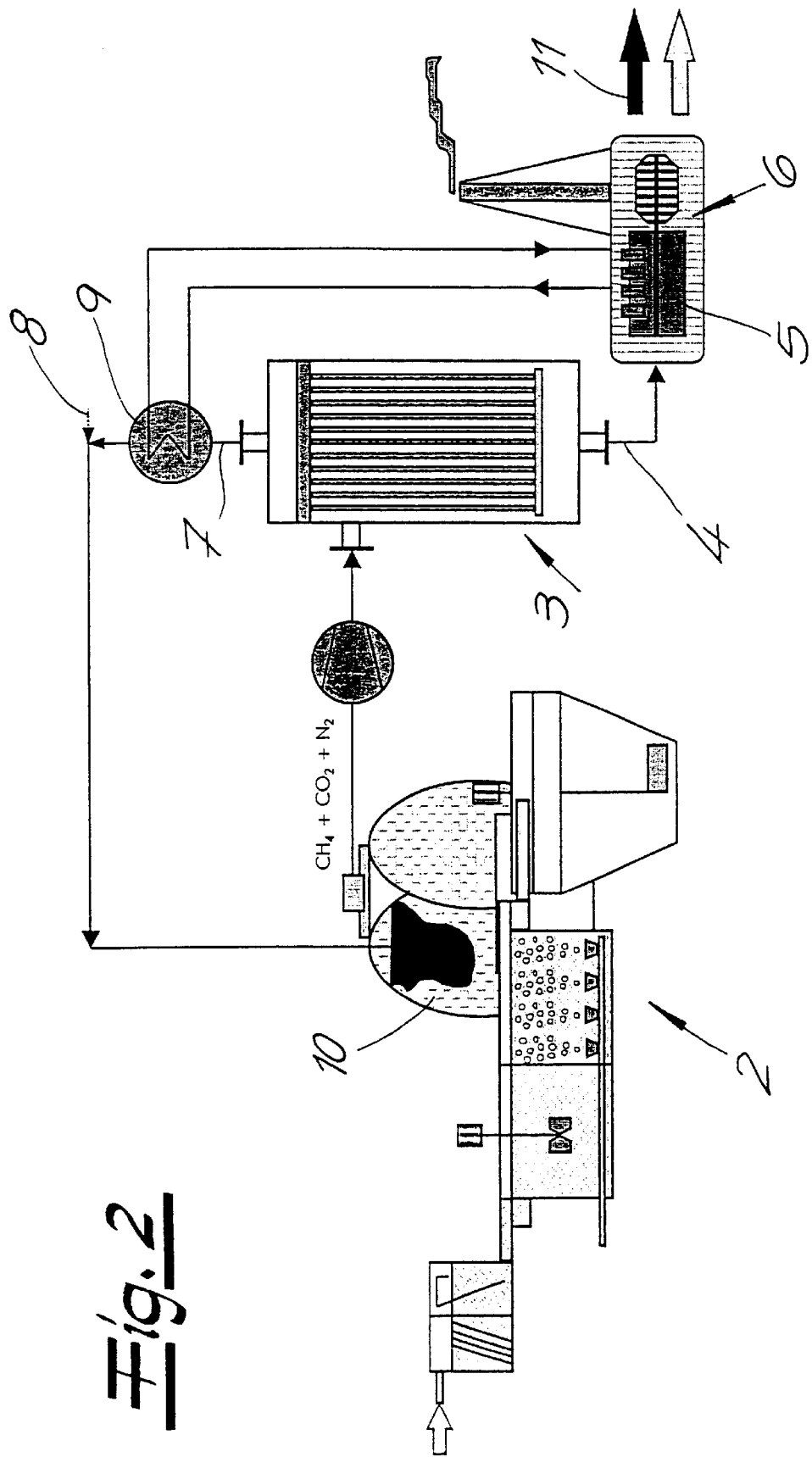

METHOD OF UTILIZING A METHANE-CONTAINING BIOGAS

BACKGROUND OF THE INVENTION

1. Field of the Invention

The present invention relates to a method of utilizing a methane-containing biogas, which may be selected from the group consisting of waste dump gas and biogas originating from fermentation installations and putrefication processes of sewage treatment plants, by feeding the methane-containing biogas to a gas engine of a gas engine/generator assembly generating electricity.

2. Description of the Prior Art

It is known to install gas engine/generator assemblies in waste dumps and to operate the gas engine with waste dump gas. The waste dump gas sucked out of the waste has a content of about 50%, by volume, of methane. The remainder is comprised substantially of $CO_2$ and some nitrogen. When the waste dump is closed, the production of biogas from the waste is slowly reduced over a period of about 10 years. The installed gas catching system then increasingly sucks air into the waste so that the methane content is reduced. When the methane content is reduced below 40%, by volume, it is impossible to operate the gas engine with this lean gas, and the waste dump gas must be burned off.

As the biogas is sucked off from its generating source, $CO_2$ is removed from the process generating the biogas, the $CO_2$ being an educt for the bioreactions proceeding under anaerobic conditions in the presence of organic materials and microorganisms. Therefore, the removal of $CO_2$ has several disadvantages. In the first place, $CO_2$ is an undesirable inert gas component when the methane fuel is burned in the gas engine. In the second place, the removed $CO_2$ is no longer available as an educt for the bioreaction proceeding in the waste dump or in the fermentation installations and putrefication processes of sewage treatment plants. Furthermore, in the operation of a waste dump the removal of $CO_2$ favors the penetration of air into the waste and thus produces an undesired dilution effect.

SUMMARY OF THE INVENTION

It is the primary object of this invention to utilize methane-containing biogases in an economical manner for the generation of electricity. In particular, the method enables a biogas whose methane content is below 40%, by volume, to be used for generating electricity.

In a method of the first-described type, this and other objects are accomplished according to the invention by the steps of passing the biogas through a membrane separating installation to divide the biogas into a first gas stream having a higher methane content than the biogas fed thereto and a second gas stream enriched in $CO_2$, feeding the first gas stream to the gas engine as fuel, and returning the second gas stream to the source of the biogas.

Membranes for separating gases on the basis of very different permeabilities for methane and carbon dioxide are commercially available, and their use in the membrane separating installation enables the effective concentration of the methane content in one of the gas streams in the installation. The biogas is condensed and is fed to the gas permeation module of a membrane separation installation whose membranes have a preferred permeability for $CO_2$. The residue retained on the pressure side of the gas permeation module is fed to the gas engine while the permeate in returned to the biogas source.

This method very economically utilizes a biogas which is a lean gas containing less than 40%, by volume, of methane. It enables the gas fueling the gas engine to be sufficiently enriched in methane that it may be operated under optimal conditions, for example at an air ratio of $\lambda=1.5$ to 1.8, preferable 1.6. Conventional gas engines operate at such an air ratio with high efficiency and low exhaust gas emissions.

The method of this invention may be used advantageously in connection with waste dumps as the source of the biogas, particularly closed waste dumps. The return of the gas stream enriched with $CO_2$ to the waste prevents to a large extent the penetration of air into the waste, which is caused by the progressively decreasing production of methane. This has the advantage that the anaerobic process proceeding in the waste is not disturbed by air. In this manner, a very effective methane production may be maintained even in aging or closed waste dumps.

It is another advantage of the method of the invention that the heat and humidity required for the bioreaction and production of methane may be optimized with the aid of the gas stream returned to the waste. To obtain this result according to a preferred feature of the present invention, the second gas stream returned to the waste is heated by the waste heat produced by the gas engine, for example, and/or is humidified with water, which may be derived from the waste dump itself.

The return of the $CO_2$-enriched gas stream to the bioreaction in the waste increases the $CO_2$ partial pressure in the process of generating the methane, which enhances the methane production because the microorganisms in the waste produce methane with $CO_2$ as educt and the hydrogen-containing organic materials. In this way, the method has a considerable advantage in optimizing the operation of putrefication towers in sewage treatment plants. In addition to fueling gas engines economically with biogas, the methane production is enhanced, which shortens the dwell time of the waste in the putrefication tower and thus increases its capacity.

BRIEF DESCRIPTION OF THE DRAWING

The above and other objects, advantages and features of the present invention will become more apparent from the following detailed description of now preferred embodiments thereof, taken in conjunction with the accompanying drawing wherein FIG. 2 illustrates the method in sewage treatment plant which comprises a waste water cleaning installation with putrefication towers.

DETAILED DESCRIPTION OF THE PREFERRED EMBODIMENTS

Figure 1:
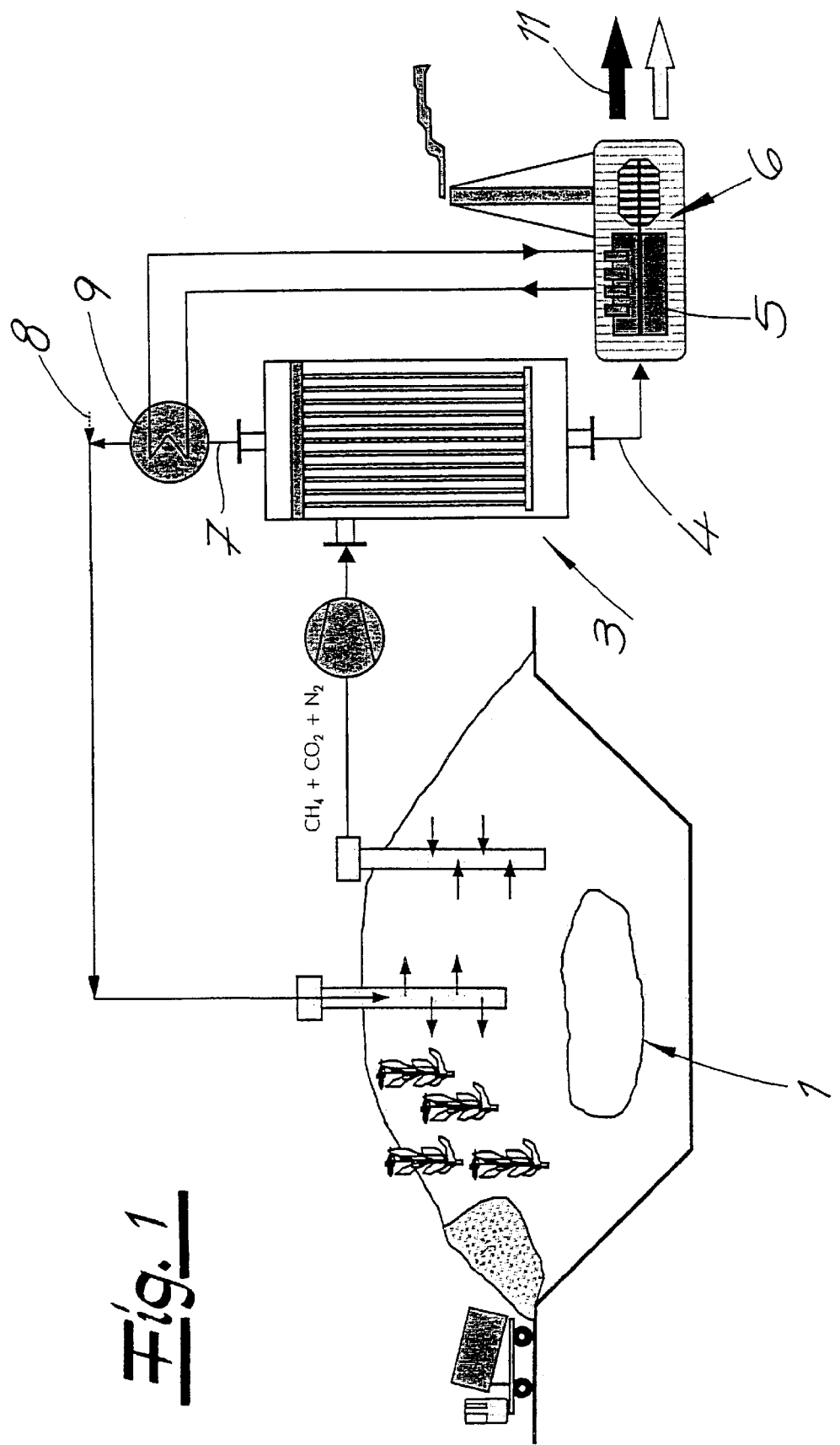
FIG. 1 illustrates the method with the utilization of waste dump gas.

FIGS. 1 and 2 illustrate the method of utilizing a methane-containing biogas by feeding the methane-containing biogas to a gas engine 5 of a gas engine/generator assembly 6 generating electricity. The biogas contains $CH_4$ and $CO_2$. In FIG. 1, the biogas is derived from a waste dump 1, and in FIG. 2 it is derived from putrefication tower 10 of a waste water cleaning installation arranged on sewage treatment plant 2. The biogas is condensed and is passed through a gas permeation module of membrane separating installation 3 to divide the biogas into a first gas stream 4 having a higher methane content than the biogas fed thereto and a second gas stream 7 enriched in $CO_2$. The membranes have a preferred permeability for $CO_2$. Therefore, the residue discharged from the pressure side of the module has a higher methane content and is fed as gas stream 4 to gas engine 5 as fuel. The biogas is sufficiently enriched with methane in membrane separating installation 3 to enable gas engine 5 to be operated at an optimal air ratio X from a motor-technical and exhaust gas-technical point of view, preferably $\lambda=1.6$. The permeate discharged from membrane separating installation 3 has a higher $CO_2$ content than the original biogas and is returned as second gas stream 7 to the source of the biogas, i.e. waste dump 1 or putrefication tower 10.

As shown in the drawing, second gas stream 7 may be humidified with water 8 and, by using the waste heat of gas engine 5, may be heated in heat exchanger 9.

The return of the $CO_2$-enriched gas stream 7 increases the partial $CO_2$ pressure in waste dump 1 and putrefication tower 10, respectively, thus enhancing the methane production because the microorganism produce methane with $CO_2$ as educt and the hydrogen-containing organic materials. The heating and humidifying of this gas stream further optimizes the reaction process.

The gas permeation modules may be commercially available modules with membrane coils, hollow filament membranes of capillary membranes. The membrane material may be, for example, polysulfones, particularly with a coating of silicone, polyethersulfone, polyimide, cellulose acetate, or the like. Such materials have a preferred permeability for $CO_2$ and only a low permeability for $N_2$ and methane. Depending on the biogas amount and the required concentration, several gas permeation modules may be connected in parallel and/or in series.

The generated electric current 11 may be supplied to a current network. As is evident from the above, a highly efficient operation of gas engine/generator assembly 6 may be obtained with the method of the present invention with a gas containing relatively low amounts of methane, making it possible, for example, to prolong the operation after a waste dump has been closed and the methane production generated is progressively reduced, as well as with biogas generated in sewage treatment plants, where the return of the $CO_2$-enriched gas stream to the source of the biogas enhances the production of methane.

What is claimed is:

1. A method of utilizing a methane-containing biogas containing less than 40%, by volume, of methane by feeding the methane-containing biogas to a gas engine of a gas engine/generator assembly generating electricity, comprising the steps of
    (a) passing the biogas through a membrane separating installation to divide the biogas into a first gas stream having a higher methane content than the biogas fed thereto and a second gas stream enriched in $CO_2$,
    (b) feeding the first gas stream to the gas engine as fuel and operating the gas engine with an air ratio $\lambda=1.5$ to 1.8, and
    (c) returning the second gas stream to the source of the biogas.

2. The method of claim 1, wherein the methane-containing biogas is selected from the group consisting of waste dump gas and biogas originating from fermentation installations and putrefication processes of sewage treatment plants.

3. The method of claim 1, wherein the air ratio $\lambda=1.6$.

4. A method of utilizing a methane-containing biogas by feeding the methane-containing biogas to a gas engine of a gas engine/generator assembly generating electricity, comprising the steps of
    (a) passing the biogas through a membrane separating installation to divide the biogas into a first gas stream having a higher methane content than the biogas fed thereto and a second gas stream enriched in $CO_2$,
    (b) feeding the first gas stream to the gas engine as fuel, and
    (c) heating the second gas stream with waste heat produced by the gas engine and returning it to the source of the biogas.

5. A method of utilizing a methane-containing biogas by feeding the methane-containing biogas to a gas engine of a gas engine/generator assembly generating electricity, comprising the steps of
    (a) passing the biogas through a membrane separating installation to divide the biogas into a first gas stream having a higher methane content that the biogas fed thereto and a second gas stream enriched in $CO_2$,
    (b) feeding the first gas stream to the gas engine as fuel, and
    (c) humidifying the second gas stream with water and returning it to the source of the biogas.

* * * * *